2,860,159
Patented Nov. 11, 1958

2,860,159
PROCESS FOR PREPARATION OF VINYL MONOESTERS

Shelby P. Sharp and Alfred Steitz, Jr., Tulsa, Okla., assignors to Pan American Petroleum Corporation, a corporation of Delaware No Drawing. Application December 28, 1956
Serial No. 631,075

11 Claims. (Cl. 260—491)

The present invention relates to a novel process for the preparation of vinyl esters. More particularly, it is concerned with the preparation of vinyl esters having the general structural formula:

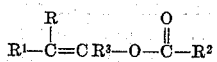

in which R, $R^1$ and $R^3$ may be either hydrogen or alkyl and $R^2$ is an alkyl group.

It is known that vinyl esters of the type indicated by the above general formula can be prepared by catalytic decomposition of the corresponding alkylidene diester. The catalyst employed is usually an acid ranging in concentration of from about 10 to about 70 percent, based on the weight of the alkylidene diester present. Numerous acids, both organic and inorganic, have been proposed as materials to catalyze the decomposition of the alkylidene diester into the corresponding vinyl ester and acid. Among such proposed materials was sulfuric acid; however, when this acid was used it was found that not only poor yields of the vinyl ester were secured, but extensive carbonization resulted under the conditions employed.

We have now discovered conditions under which sulfuric acid can be advantageously employed as a catalyst in reactions of the above mentioned type to obtain the vinyl ester in good yield and substantially without the occurrence of carbonization.

The reaction involved in the process of our invention is represented by the following equations, using acetaldehyde and acetic anhydride as the initial reactants:

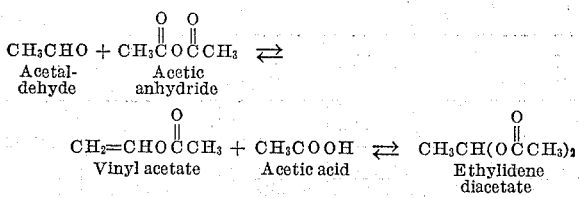

Fundamentally, our process involves reacting a suitable aldehyde with an appropriate acid anhydride to produce the corresponding diester. Thereafter, this reaction under carefully controlled conditions is partially reversed to yield the vinyl ester and the acid. The selective transformation of the alkylidene diester into the vinyl ester and corresponding acid is quite sensitive and conditions must be carefully controlled to prevent the course of the reaction from reversing and reforming the alkylidene diester from the vinyl ester and acid, or from proceeding all the way to the anhydride and aldehyde.

In accordance with one embodiment of our invention the diester is first prepared from the aldehyde and the acid anhydride in a known manner in the presence of a small amount of a Friedel-Crafts type catalyst (see Jour. Am. Chem. Soc. 72, 847 (1950)). The resulting diester is then fed into a suitable reaction zone having a fractionating tower operating in conjunction therewith. The diester, as introduced, contains not more than about 1 weight percent of sulfuric acid, preferably from about 0.2 to about 0.5 weight percent, based on the vinyl diester present. This mixture is thereafter heated to a temperature sufficient to take overhead the acid and vinyl ester resulting from decomposition of the diester. The temperature of the mixture in the bottoms, i. e. the decomposition or reaction zone, however, is maintained at a level below the boiling point of the diester. Under these conditions the vinyl ester and liberated acid are taken overhead as soon as they are formed, thereby immediately removing them from contact with the catalyst and thus avoiding conversion to acetaldehyde and acetic anhydride.

Feed rate, heat input and withdrawal rate are adjusted so that the column operates smoothly at a bottoms temperature below the boiling point of the diester but above the boiling points of the liberated acid and vinyl ester. The fractionating column may be operated in a manner such that the liberated acid and components boiling below said acid, including the vinyl ester, are all brought overhead in a single stream. Or, if desired, the vinyl ester may be recovered as a separate overhead stream together with components boiling below said ester and the acid may be recovered as a side stream. Alternatively, the vinyl ester and acid may both be collected as separate side streams with impurities boiling below said ester going overhead. After the product is secured it may be subjected to further distillation, the thoroughness of such operation depending, of course, on whether the vinyl ester was taken overhead, removed as a mixture in a side stream with the acid or removed as a side stream substantially free of acid. In this connection we have observed that vinyl esters, such as vinyl acetate, on standing in the presence of acetic acid and sulfur dioxide, which is a decomposition product of the sulfuric acid, reverts to ethylidene diacetate thus lowering the ultimate recovery of the desired vinyl acetate. This result can be avoided by washing the product distillate with a nonaqueous solution of sodium acetate or equivalent alkaline compound in acetic acid, thereby removing the sulfur dioxide present in the form of a sulfite. The alkaline compounds used for this purpose are preferably the alkali metal salts of the acid formed in the decomposition of the diester. By neutralizing the sulfur dioxide in this manner the alkali metal sulfite is formed with the simultaneous regeneration of the free acid which can ultimately be converted into the corresponding acid anhydride used in preparation of the feed to our process.

While the process of our invention is readily adapted to the preparation of vinyl acetate and vinyl propionate from the corresponding ethylidene diacetate and ethylidene dipropionate, it may likewise be employed to obtain vinyl esters of the higher fatty acids, such as for example palmitic and stearic acids. Likewise the type of vinyl grouping in the components produced in accordance with our invention may vary widely and will depend on the particular aldehyde reacted with the acid anhydride. As examples of aldehydes that may be used in preparing the alkylidene diesters there may be mentioned isobutyraldehyde, butyraldehyde, valeraldehyde, heptaldehyde, etc.

Our process may be carried out in conventional distillation and auxiliary apparatus, preferably fabricated out of or lined with stainless steel. Ordinary plate type (perforated or bubble cap) fractionating columns may be used. The fractionating column operates in conjunction with an adequate condensing system from which distillate product is withdrawn. As previously indicated, if said product is permitted to stand for an appreciable time, e. g. 15 to 20 hours, it may be desirable to subject it to further fractionation inasmuch as there is evidence that the acid in the presence of sulfur dioxide tends to react with the vinyl ester to produce the vinyl diester. On distillation of the aforesaid product any ethylidene diester formed is recovered as bottoms and combined with the original still charge to be decomposed into the vinyl monoester.

The process of our invention may be further illustrated by the following example in which vinyl acetate is prepared by the catalytic decomposition of ethylidene diacetate.

EXAMPLE I

Equal molar quantities of acetaldehyde and acetic anhydride were reacted in the presence of 0.1 weight percent zinc chloride. The acetic anhydride prior to reaction was heated to about 100° C. On addition of the acetaldehyde to the hot acetic anhydride the reaction was practically instantaneous. Simple distillation of the resulting reaction mixture gave a distillate having the following composition:

| Component: | Weight percent |
|---|---|
| Ethylidene diacetate | 88.28 |
| Acetic anhydride | 7.42 |
| Acetic acid | 3.64 |
| Acetaldehyde | 0.27 |
| Vinyl acetate | 0.18 |
| Paraldehyde | 0.21 |

Feedstock suitable for use in the process of the present invention was then prepared by adding 0.46 weight percent sulfuric acid.

To start the run, approximately 200 parts (all parts by weight unless otherwise designated) of acetic anhydride were charged to the still kettle. The system was placed on total reflux until temperatures throughout the 25 plate (perforated plate) column came to equilibrium. When the temperature at the draw-off section was steady, ethylidene diacetate feed containing sulfuric acid in the concentration mentioned above was then pumped into the still kettle at a constant rate. The liquid level in the kettle was held constant by varying the feed rate at constant reflux ratio (10:1) and boil-up rate to maintain distillate rate equal to feed rate. In the course of this run product samples were collected during successive two hour test periods. Test period 5A represented five minutes of operation. The samples were analyzed immediately upon withdrawal, with the exception of the test period 7 product sample which was examined two and one-half days after production. Operating conditions and results obtained are given in the table below.

From an inspection of the data it will be seen that the production from lined out operation contained about 25 percent acetic anhydride (test periods 4 to 6) and also about 5 percent acetaldehyde. The ethylidene diacetate content of the product varied between 12 and 18 percent. Certain evidence appears which suggests that part of the ethylidene diacetate is formed from anhydride and aldehyde in the product before analysis. This opinion is strengthened by the fact that the composition of the sample representing five minutes production (test period 5A) contained more aldehyde and anhydride and less ethylidene diacetate than the immediately preceding or subsequent samples. Also, the product sample from test period 7 which stood for two and one-half days before analysis showed a very high diacetate content and practically no acetaldehyde. Trace amounts of sulfur dioxide could be detected in the distillate product. The yield of vinyl acetate varied from 40 to 60 percent of the theoretical, the lowest yield of vinyl acetate after the run was lined out being the 43 percent yield obtained during test period 7. As previously mentioned, this particular sample stood for two and one-half days before it was analyzed. It is thus possible that vinyl acetate and acetic acid under such conditions react slowly to produce ethylidene diacetate. This reaction is not necessarily disadvantageous since the diacetate can be separated readily from the vinyl acetate and the former recycled as feed to the still kettle.

EXAMPLE II

In this particular run vinyl propionate was prepared, under conditions similar to those described in Example I, from a feed having the following composition:

| Component: | Weight percent |
|---|---|
| Ethylidene dipropionate | 96.1 |
| Paraldehyde | 0.0 |
| Ethylidene diacetate | 1.6 |
| Propionic acid | 1.6 |
| Acetic acid | 0.0 |
| Acetaldehyde | 0.0 |
| Propionic anhydride | 0.0 |
| Vinyl propionate | 0.7 |

To a feed, having the above indicated composition, sulfuric acid was added in a concentration of 1.0 weight percent.

Table I

| Test Period | Line-out Period | 1 | 2 | 3 | 4 | 5A | 5 | 6 | 7 |
|---|---|---|---|---|---|---|---|---|---|
| Duration of Test Period, hr | 1 | 2 | 2 | 2 | 2 | 5 min. | 2 | 2 | 2 |
| Weight percent H₂SO₄ in kettle | | | | 0.28 | 0.27 | | 0.29 | 0.30 | 0.32 |
| Temperatures, °C.: | | | | | | | | | |
| Top column | 116.2-127.0 | 120.3-125.2 | 114.2-120.5 | 109.2-112.8 | 110.5-114.5 | | 113.7-117.5 | 113.3-117.4 | 113.5-117.2 |
| Plate 10 | 135.8-136.0 | 135.2-135.8 | 133.9-135.2 | 133.0-133.8 | 133.4-133.8 | | 133.6-134.0 | 133.5-133.9 | 133.5-133.7 |
| Kettle | 139.1-140.1 | 140.1-141.3 | 141.3-142.0 | 140.6-142.0 | 140.6-140.9 | | 140.8-141.2 | 141.3-141.6 | 141.5-141.6 |
| Feed During Period, parts | 76.4 | 88.0 | 110.5 | 107.3 | 87.1 | 3.4 | 91.3 | 95.5 | 99.1 |
| Distillate: | | | | | | | | | |
| Weight during period, parts | 55.0 | 93.1 | 94.9 | 97.5 | 94.7 | 4.14 | 95.3 | 94.5 | 99.2 |
| Composition, wt. percent [1]— | | | | | | | | | |
| Vinyl acetate | 13.62 | 19.88 | 24.32 | 30.49 | 28.68 | 25.65 | 25.02 | 24.95 | 22.47 |
| Acetic Acid | 30.16 | 22.81 | 24.48 | 28.37 | 27.84 | 27.95 | 25.52 | 25.20 | 24.61 |
| Paraldehyde | 0.0 | 0.02 | 2.60 | 1.92 | 1.58 | 0.94 | 1.52 | 1.75 | 0.00 |
| Acetic Anhydride | 48.81 | 41.93 | 30.69 | 21.19 | 24.27 | 33.30 | 25.39 | 24.50 | 9.36 |
| Acetaldehyde | 0.22 | 0.56 | 1.75 | 5.82 | 5.70 | 9.27 | 4.89 | 5.33 | 0.28 |
| Ethylidene diacetate | 7.19 | 14.80 | 16.16 | 12.21 | 11.93 | 2.89 | 17.66 | 18.27 | 43.28 |
| Pot Composition, wt. percent: [1] | | | | | | | | | |
| Vinyl acetate | | | | 0.62 | 0.62 | 0.62 | 0.33 | 0.81 | 0.83 |
| Acetic acid | | | | 0.36 | 0.42 | 0.42 | 0.05 | 0.60 | 1.02 |
| Paraldehyde | | | | 0.07 | 0.20 | 0.20 | 0.00 | 0.17 | 0.00 |
| Acetic anhydride | | | | 66.30 | 67.35 | 67.35 | 66.81 | 63.73 | 64.71 |
| Acetaldehyde | | | | 0.00 | 0.00 | 0.00 | 0.00 | 0.66 | 0.00 |
| Ethylidene diacetate | | | | 32.65 | 31.41 | 31.41 | 32.81 | 33.95 | 33.44 |
| Vinyl Acetate Yield, Percent of Theory | 19 | 40 | 40 | 53 | 60 | 66 | 50 | 48 | 43 |

[1] By mass spectrograph.

The conditions employed and results obtained are shown in the table appearing below:

*Table II*

DECOMPOSITION OF ETHYLIDENE DIPROPIONATE

| Test Period | Line-out Period | 1 | 2 | 3 | 4 | 5 | 6 |
|---|---|---|---|---|---|---|---|
| Duration, hrs | 4 | 1 | 1 | 2 | 2 | 2 | 2 |
| Temperatures, °C.: | | | | | | | |
| Top column | 20–117° | 117°±5° | 117°±5° | 117°±5° | 117°±5° | 117°±5° | 117°±5° |
| Plate 10 | 35–139 | 139.2–139.8 | 139.2–139.5 | 139.5–139.9 | 139.6–140.0 | 139.6–139.7 | 139.6–139.8 |
| Pot | 150.5–163.1 | 163.6–164.2 | 164.6–165.4 | 165.4–166.8 | 167.0–168.4 | 168.2–168.5 | 168.4–169.3 |
| Feed During Period, g | 79.4 | 20.8 | 21.6 | 41.8 | 42.3 | 42.2 | 39.4 |
| Distillate: | | | | | | | |
| Wt. During Period, g | 108.5 | 12.7 | 13.9 | 25.3 | 23.9 | 21.5 | 19.2 |
| Composition, wt. percent [1] | | | | | | | |
| Vinyl Propionate | 29.7 | 18.6 | 19.7 | 19.9 | 20.3 | 20.1 | 21.3 |
| Propionic Acid | 13.3 | 47.0 | 47.1 | 51.5 | 52.1 | 50.6 | 46.9 |
| Paraldehyde | 45.0 | 22.7 | 23.2 | 19.3 | 17.6 | 18.9 | 20.7 |
| Acetaldehyde | 7.7 | 7.1 | 7.0 | 7.2 | 6.7 | 7.1 | 7.6 |
| Acetic Acid | 4.3 | 4.4 | 2.8 | 2.4 | 2.4 | 2.4 | 2.8 |
| Ethylidene Dipropionate | 0.0 | 0.2 | 0.2 | 0.9 | 0.9 | 0.9 | 0.8 |
| Ethylidene Diacetate | 0.0 | 0.0 | 0.0 | 0.0 | 0.0 | 0.0 | 0.0 |
| Propionic Anhydride | 0.0 | 0.0 | 0.0 | 0.0 | 0.0 | 0.0 | 0.0 |
| Pot Composition, wt. percent: [1] | | | | | | | |
| Vinyl Propionate | | 0.0 | 0.0 | 0.0 | 0.0 | 0.0 | 0.0 |
| Propionic Acid | | 5.4 | 4.9 | 1.4 | 0.0 | 0.0 | 0.0 |
| Paraldehyde | | 0.0 | 0.0 | 0.0 | 0.0 | 0.0 | 0.0 |
| Acetaldehyde | | 0.0 | 0.0 | 0.0 | 0.0 | 0.0 | 0.0 |
| Acetic Acid | | 0.0 | 0.0 | 0.0 | 0.0 | 0.0 | 0.0 |
| Ethylidene Dipropionate | | 10.4 | 10.1 | 9.6 | 10.5 | 11.8 | 12.4 |
| Ethylidene Diacetate | | 0.0 | 0.0 | 0.0 | 0.0 | 0.0 | 0.0 |
| Propionic Anhydride | | 84.2 | 85.0 | 89.0 | 89.5 | 88.2 | 87.6 |
| Vinyl Propionate Yield, Percent of Theory | 73.7 | 20.6 | 23.0 | 21.8 | 20.7 | 18.5 | 18.7 |

[1] By mass spectrograph.

It will be appreciated by those skilled in the art that the elements of our invention can be applied with similar effectiveness to the vinyl esters in general from corresponding alkylidene diesters. Accordingly, it is to be understood that any such process employing sulfuric acid in the concentration ranges stated and under the operating conditions disclosed, is to be construed as lying within the scope of our invention.

We claim:

1. In a process for the preparation of a vinyl monoester from the corresponding alkylidene diester of a carboxylic acid having from 2 to 18 carbon atoms, the improvement which comprises effecting the decomposition of said diester in a reaction zone in the presence of not more than about 1 weight percent of sulfuric acid, based on said diester, subjecting this mixture to a temperature above the boiling point of said vinyl monoester and the acid generated in the decomposition of said diester but below the boiling point of the latter, whereby said monoester and said acid are immediately removed from said zone as formed to avoid contact with the sulfuric acid in said zone, and recovering said monoester.

2. The process of claim 1 in which the concentration of sulfuric acid employed ranges from about 0.2 to about 0.5 weight percent.

3. The process of claim 2 in which the alkylidene diester employed is ethylidene diacetate and the monoester is vinyl acetate.

4. The process of claim 2 in which the alkylidene ester is ethylidene dipropionate and the vinyl ester is vinyl propionate.

5. In a continuous process for the preparation of a vinyl ester from the corresponding alkylidene diester of a carboxylic acid having from 2 to 18 carbon atoms, the improvement which comprises continuously introducing said alkylidene diester into a reaction zone together with not more than about 1 weight percent of sulfuric acid, subjecting said diester and sulfuric acid to decomposition in a reaction zone the temperature of which is above the boiling point of said vinyl monoester and the acid generated in the decomposition of said diester but below the boiling point of the latter, whereby said monoester and said acid are immediately and continuously removed from said zone as formed to avoid contact with said sulfuric acid, and recovering said monoester.

6. The process of claim 5 in which the concentration of sulfuric acid employed ranges from about 0.2 to about 0.5 weight percent.

7. The process of claim 6 in which the alkylidene diester employed is ethylidene diacetate and the monoester is vinyl acetate.

8. The process of claim 6 in which the alkylidene is ethylidene dipropionate and the vinyl ester is vinyl propionate.

9. In a continuous process for the preparation of a vinyl monoester from the corresponding alkylidene diester of a fatty acid having from 2 to 18 carbon atoms, the improvement which comprises continuously introducing said alkylidene diester into a reaction zone together with from about 0.2 to about 0.5 weight percent sulfuric acid, subjecting this mixture of said diester and sulfuric acid to a temperature in said zone which is above the boiling point of said vinyl ester and the acid generated in the decomposition of said diester but below the boiling point of the latter, whereby a portion of said sulfuric acid is decomposed into sulfur dioxide and whereby said monoester, said acid and said sulfur dioxide are immediately and continuously removed from said zone as formed, recovering the resulting mixture which consists essentially of said monoester acid and said sulfur dioxide and immediately thereafter selectively removing said sulfur dioxide from said mixture.

10. The process of claim 9 in which the alkylidene diester employed is ethylidene diacetate and the monoester is vinyl acetate..

11. The process of claim 9 in which the alkylidene diester is ethylidene dipropionate and the vinyl monoester is vinyl propionate.

References Cited in the file of this patent

UNITED STATES PATENTS

| | | |
|---|---|---|
| 1,450,982 | Marshall et al. | Apr. 10, 1923 |
| 2,425,389 | Oxley et al. | Aug. 12, 1947 |